United States Patent
Lee et al.

(10) Patent No.: US 6,991,868 B2
(45) Date of Patent: Jan. 31, 2006

(54) FUEL CELL ASSEMBLY

(75) Inventors: Sang-Joon John Lee, Stanford, CA (US); Jun Sasahara, Saitama (JP); Nariaki Kuriyama, Saitama (JP); Tadahiro Kubota, Saitama (JP); Toshifumi Suzuki, Tokyo (JP); Friedrich B. Prinz, Stanford, CA (US); Suk Won Cha, Stanford, CA (US); Amy Chang-Chien, Stanford, CA (US); Yaocheng Liu, Stanford, CA (US); Ryan O'Hayre, Stanford, CA (US)

(73) Assignees: Honda Giken Kogyo Kabushiki Kaisha, Tokyo (JP); The Board of Trustees of the Lealand Stanford Junior University, Palo Alto, CA (US)

( * ) Notice: Subject to any disclaimer, the term of this patent is extended or adjusted under 35 U.S.C. 154(b) by 391 days.

(21) Appl. No.: 10/275,591
(22) PCT Filed: May 8, 2001
(86) PCT No.: PCT/US01/11763
§ 371 (c)(1),
(2), (4) Date: Apr. 1, 2003
(87) PCT Pub. No.: WO01/95406
PCT Pub. Date: Dec. 13, 2001

(65) Prior Publication Data
US 2004/0091765 A1    May 13, 2004

Related U.S. Application Data

(60) Provisional application No. 60/202,827, filed on May 8, 2000, provisional application No. 60/242,136, filed on Oct. 23, 2000.

(51) Int. Cl.
H01M 2/14    (2006.01)
H01M 2/08    (2006.01)
H01M 2/00    (2006.01)
H01M 8/10    (2006.01)

(52) U.S. Cl. .............. 429/38; 429/35; 429/34; 429/32

(58) Field of Classification Search ............ 429/32, 429/34, 38, 35
See application file for complete search history.

(56) References Cited

U.S. PATENT DOCUMENTS 4,997,726 A * 3/1991 Akiyama et al. ............ 429/30
5,268,241 A * 12/1993 Meacham .................... 429/35
6,127,058 A * 10/2000 Pratt et al. .................. 429/30

FOREIGN PATENT DOCUMENTS

EP    0924785    6/1999

(Continued)

OTHER PUBLICATIONS

Written Opinion.

*Primary Examiner*—Patrick Joseph Ryan
*Assistant Examiner*—Thomas H. Parsons
(74) *Attorney, Agent, or Firm*—Lumen Intellectual Property Services, Inc.

(57) ABSTRACT

In a fuel cell assembly comprising a plurality of cell each including an electrolyte layer (2), a pair of diffusion electrode layers (3, 4) interposing the electrolyte layer between them, and a pair of flow distribution plates (5) for defining passages (11) for fuel and oxidant fluids that contact the diffusion electrode layers, the fuel cells are arranged on a common plane. Therefore, the vertical dimension of the fuel cell assembly can be minimized, and a fuel cell assembly of favorable electric properties can be achieved. Each flow distribution plate is typically formed with communication passages for communicating fluid passages defined on each side of the electrolyte layer at a prescribed pattern. The communication passages and through holes communicate the fluid passages in such a manner that adjacent fuels cells have opposite polarities.

13 Claims, 12 Drawing Sheets

FOREIGN PATENT DOCUMENTS

| | | |
|---|---|---|
| EP | 0959511 | 11/1999 |
| GB | 2286482 | 8/1995 |
| WO | WO 9954131 | 10/1999 |
| WO | WO 9957780 | 11/1999 |

* cited by examiner

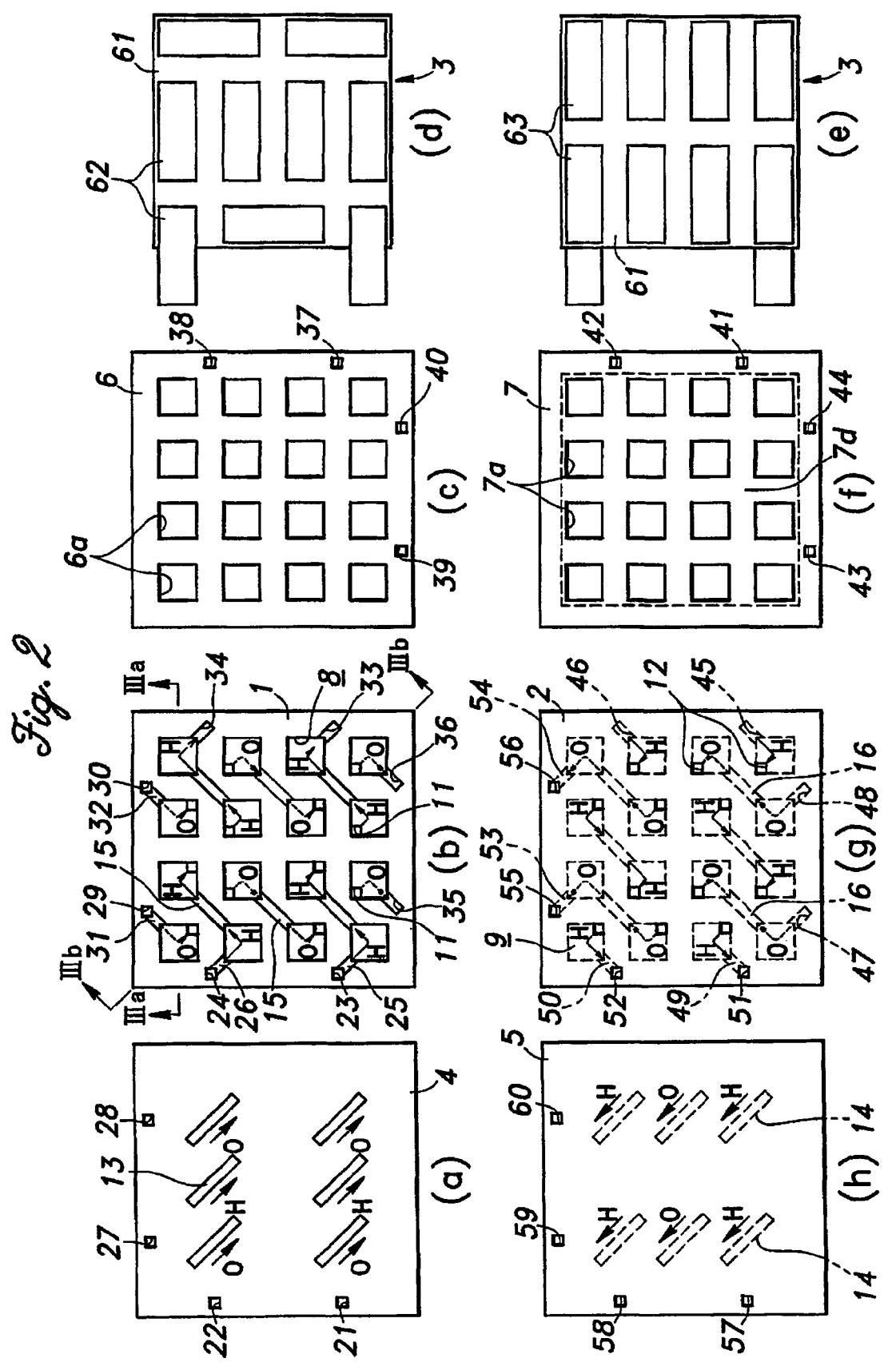

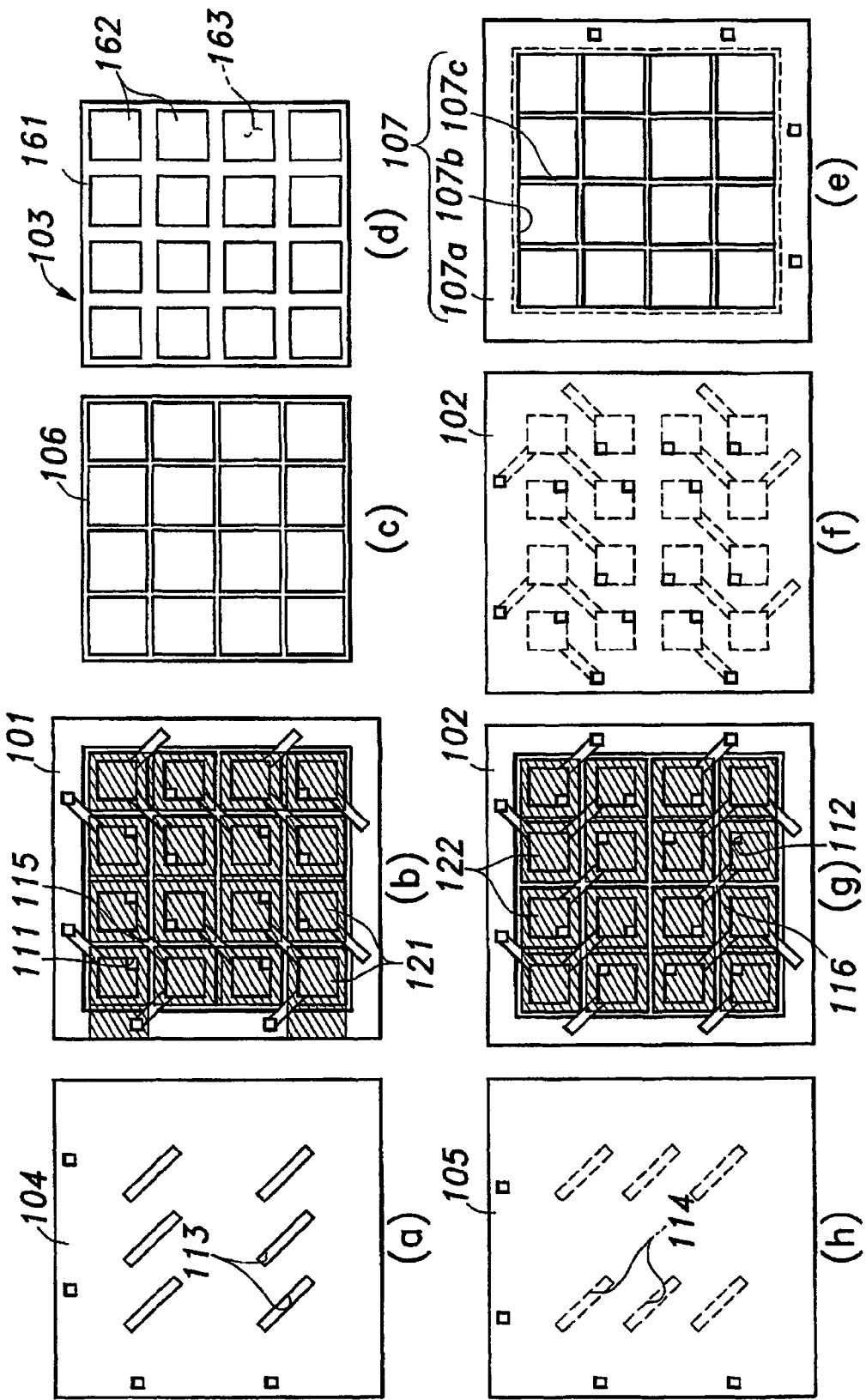

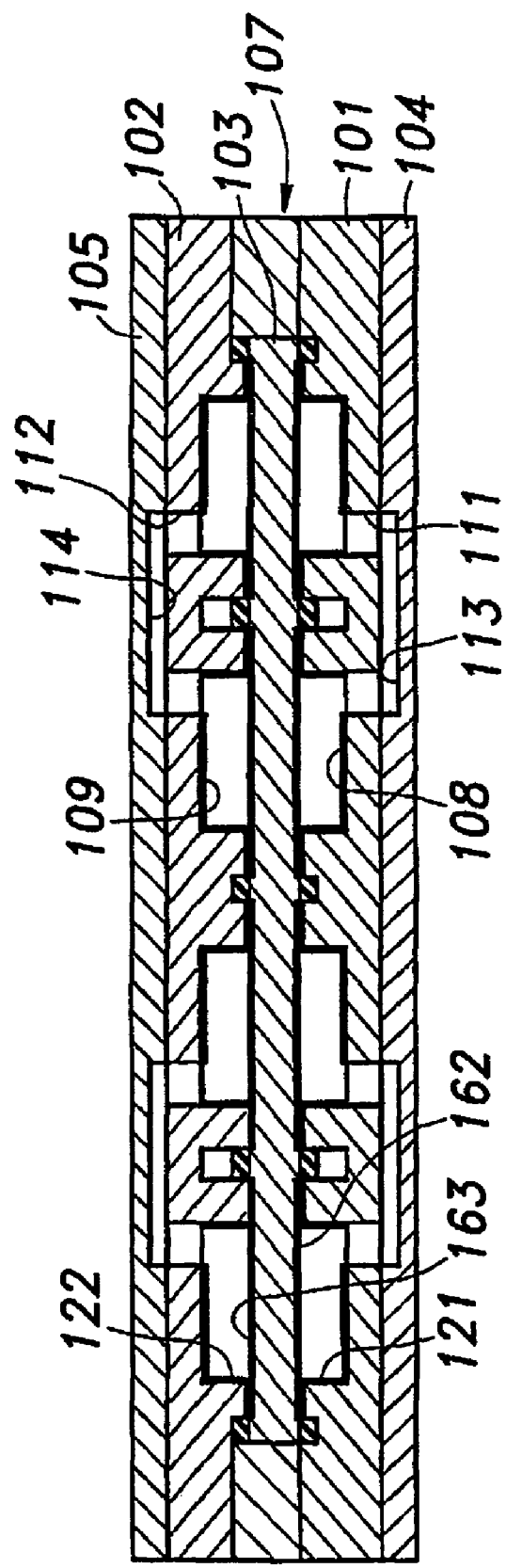

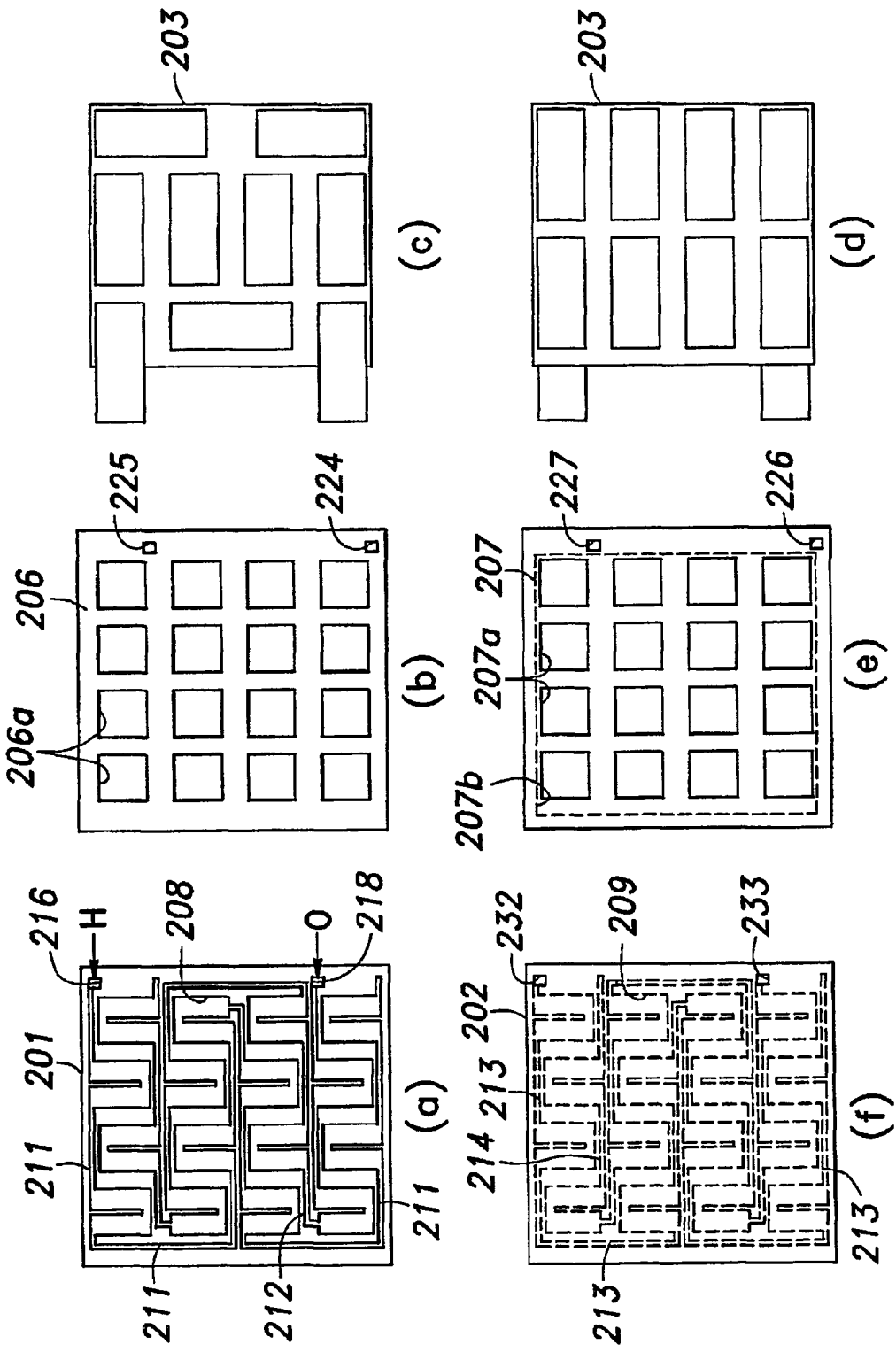

FUEL CELL ASSEMBLY

This application claims the benefit of U.S. Provisional Application Nos. 60/202,827, filed May 8, 2000, and 60/242,136, filed Oct. 23, 2000, both of which are herein incorporated by reference.

TECHNICAL FIELD

The present invention relates to a fuel cell assembly having a planar arrangement.

BACKGROUND OF THE INVENTION

A fuel cell comprises an electrolyte layer and a pair of electrodes placed on either side of the electrolyte layer, and generates electricity through an electrochemical reaction between fuel gas such as hydrogen and alcohol and oxidizing gas such as oxygen and air, which are supplied to the corresponding electrodes, with the aid of a catalyst. There are a number of different types of fuel cells that have been proposed. Many of them use liquid electrolytes, but those using solid electrolytes are being preferred more and more for the ease of fabrication and handling.

However, the voltage output produced from each cell is very low, typically in the order of 1 volt or less, and most applications require substantially higher voltages. Therefore, it is necessary to connect individual fuel cells electrically in series or stack a number of individual fuel cells. In either case, the fabrication process gets complicated, and the fabrication cost increases. Also, it is not easy to ensure proper electric insulation between individual fuel cells, and reduce the internal resistance of the electrical path in the fuel cell assembly.

Conventionally, because of the need to form fuel and oxidant passages for a number of fuel cells of an assembly, there has been some difficulty in achieving a compact design of a fuel cell assembly. In particularly, previously proposed fuel cells typically had stacked structures, and this necessitated a certain dimension in the stacking direction. However, in some applications, it is desirable to provide a fuel cell assembly in the form of a sheet.

BRIEF SUMMARY OF THE INVENTION

In view of such problems of the prior art, a primary object of the present invention is to provide a fuel cell assembly which includes a number of fuel cells in a planar arrangement as an integral assembly.

A second object of the present invention is to provide a fuel cell assembly which can produce a high voltage without stacking a large number of fuel cells.

A third object of the present invention is to provide a fuel cell assembly which is easy to fabricate.

A fourth object of the present invention is to provide a fuel cell assembly which provides a favorable insulation.

These and other objects of the present invention can be accomplished by providing a fuel cell assembly comprising a plurality of cells each including an electrolyte layer, a pair of diffusion electrode layers interposing the electrolyte layer between them, and a pair of flow distribution plates for defining passages for fuel and oxidant fluids that contact the diffusion electrode layers, wherein: the fuel cells are arranged on a common plane.

Thus, a fuel cell assembly in the form of a sheet can be obtained, and it can provide a desired high voltage at will. To supply fuel fluid and oxidant fluid to fluid passages adjoining the diffusion electrodes provided on both sides of the electrolyte layer, communication passages for communicating the fluid passages defined on each side of the electrolyte layer at a prescribed pattern may be formed on at least one side of the flow distribution plate. According to a preferred embodiment of the present invention, the communication passages are formed primarily on a side of each of the flow distribution plates facing the electrolyte layer.

The communication passages necessarily take up a certain amount of area of the fuel cell assembly, and such an area reduces the area that is effective in directly producing electricity. To minimize such an area that does not directly contributes to the generation of electricity, the communication passages may extend on both sides of each flow distribution plate. Based upon such a consideration, a communication passage plate may be placed on a side of at least one of the flow distribution plates facing away from the electrolyte layer. In this case, the communication passages may include first communication passages that are defined between the flow distribution plate and communication passage plate so as to communicate with the corresponding fluid passages via through holes formed in the flow distribution plate, and second communication passages that are defined between the flow distribution plate and electrolyte layer so that the fluid passages are communicated with one another according to a prescribed pattern jointly by the first and second communication passages.

Typically, each of the flow distribution plates comprises a plurality of recesses formed on a side thereof facing the electrolyte layer so as to form individual cells, the recesses being communicated to one another according to a prescribed pattern by the communication passages. In this case, the area of the fuel cell assembly that does not directly contribute to the generation of electricity can be minimized by placing a communication passage plate on an outer side of each flow distribution plate, the communication passage plate being provided, on a side facing the flow distribution plate, with grooves for communicating the recesses with one another according to a prescribed pattern jointly with through holes passed across the flow distribution plate.

It is preferable to arrange the communication passages and through holes communicating the fluid passages in such a manner that adjacent fuels cells have opposite polarities. By so doing, the arrangement for connecting the fuel cells electrically in series can be simplified.

According to a particularly preferred embodiment of the present invention, the fuel cells share a common planar electrolyte layer so that the fabrication process for the fuel cell assembly may be simplified. In this case, the fuel cells may comprise those disposed in a peripheral part of the electrolyte layer, and those disposed in a central part of the electrolyte layer.

It is essential to prevent cross-talk between the fuel fluid and oxidant fluid in the fuel cell assembly. This can be easily accomplished by using a seal plate interposed between each of the flow distribution plates and the electrolyte layer so as to seal off adjacent recesses from one another, the communication passages and through holes communicating the recesses in such a manner that adjacent fuels cells have opposite polarities.

The peripheral part of the fuel cell assembly can be sealed in a reliable manner if one of the seal plates is provided with a central recess and a relatively thick peripheral part in such a manner that the two seal plates are sealably engaged with each other along a peripheral part thereof while the electrolyte layer is received in the central recess.

According to a preferred embodiment of the present invention, at least one of the seal plates may comprise a grid-shaped portion which is adapted to be received in corresponding grooves formed on the opposing surface of the corresponding flow distribution plate.

The serial electric connection between adjacent fuel cells can be accomplished in a number of different ways. For instance, the diffusion electrode layers may extend across parts of the electrolyte layer belonging to adjacent cells according to a prescribed pattern so that at least part of the plurality of cells are electrically connected in series. Alternatively, the fuel cells may be provided with individual diffusion electrode layers, the fuel cell assembly further comprising interconnect electrode layers which extend across diffusion electrode layers of adjacent cells according to a prescribed pattern so that at least part of the plurality of cells are electrically connected in series.

BRIEF DESCRIPTION OF THE DRAWINGS

Now the present invention is described in the following with reference to the appended drawings, in which:

FIG. 2(a) is a plan view showing the communication passage plate provided on one side of the fuel cell of FIG. 1;

FIG. 2(b) is a plan view showing one of the flow distribution plates of the fuel cell of FIG. 1;

FIG. 2(c) is a plan view showing the seal plate interposed between the flow distribution plate and electrolyte layer;

FIG. 2(d) is a plan view of one of the sides of the electrolyte facing the one flow distribution plate;

FIG. 2(e) is a plan view of the other side of the electrolyte facing the other flow distribution plate;

FIG. 2(f) is a plan view showing the seal plate interposed between the other flow distribution plate and electrolyte layer;

FIG. 2(g) is a plan view of the other flow distribution plate;

FIG. 2(h) is a plan view showing the communication passage plate provided on the other side of the fuel cell;

FIG. 3(a) is a sectional view taken along line IIIa—IIIa of FIG. 2(b);

FIG. 3(b) is a sectional view taken along line IIIb—IIIb of FIG. 2(b);

FIG. 6(a) is a plan view showing the communication passage plate provided on one side of the fuel cell of FIG. 5;

FIG. 6(b) is a plan view showing one of the flow distribution plates of the fuel cell of FIG. 5;

FIG. 6(c) is a plan view showing the seal plate interposed between the flow distribution plate and electrolyte layer;

FIG. 6(d) is a plan view of one of the sides of the electrolyte facing the one flow distribution plate;

FIG. 6(e) is a plan view of the other side of the electrolyte facing the other flow distribution plate;

FIG. 6(f) is a plan view showing the seal plate interposed between the other flow distribution plate and electrolyte layer, FIG. 6(g) is a plan view of the other flow distribution plate;

FIG. 6(h) is a plan view showing the communication passage plate provided on the other side of the fuel cell;

FIG. 10(a) is a plan view showing one of the flow distribution plates of the fuel cell of the third embodiment;

FIG. 10(b) is a plan view showing the seal plate interposed between the flow distribution plate and electrolyte layer;

FIG. 10(c) is a plan view of one of the sides of the electrolyte facing the one flow distribution plate;

FIG. 10(d) is a plan view of the other side of the electrolyte facing the other flow distribution plate;

FIG. 10(e) is a plan view showing the seal plate interposed between the other flow distribution plate and electrolyte layer;

FIG. 10(f) is a plan view of the other flow distribution plate;

DETAILED DESCRIPTION OF THE PREFERRED EMBODIMENTS

Figure 1:
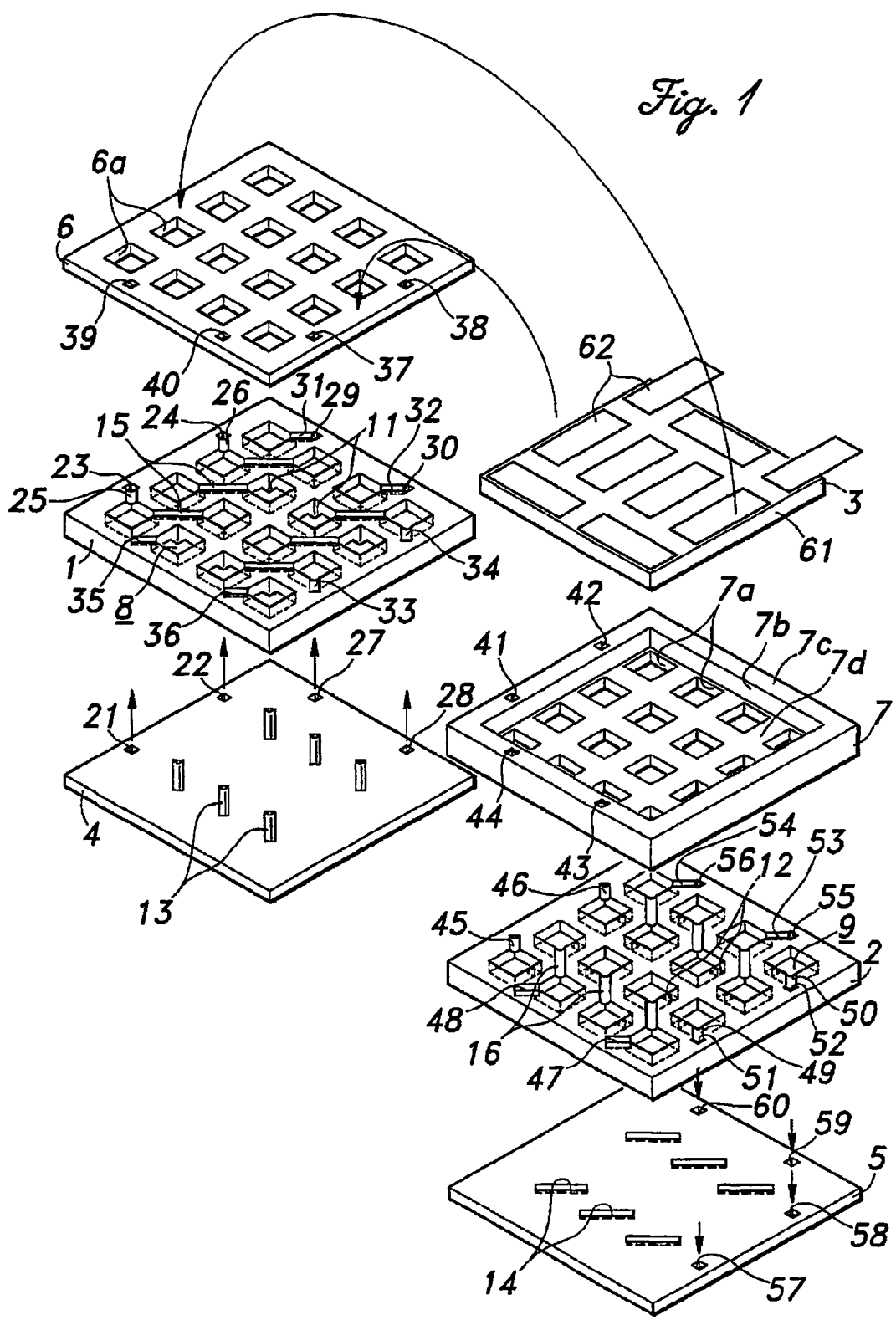
FIG. 1 is a perspective view of a fuel cell given as a first embodiment of the present invention.

FIG. 1 is an exploded perspective view showing a first embodiment of the present invention given as a planar fuel cell assembly, and FIGS. 2(a) to 2(h) are plan views showing different parts of the fuel cell assembly. In this fuel cell assembly, fuel consisting of reformed alcohol, hydrogen gas or the like is supplied to each fuel cell stack along with oxidizing agent such as air. The fuel and oxidizing agent are treated as gas throughout this application, but may also consist of liquid such as alcohol and hydrogen peroxide as can be readily appreciated by a person skilled in the art.

This fuel cell assembly comprises an electrolyte layer 3 interposed between a pair of flow distribution plates 1 and 2 each having a plurality (16 in this case) of rectangular recesses 8 and 9 which are arranged on a side facing the electrolyte layer 3 in a matrix pattern on a common plane so as to define passages for fuel gas or oxidizer gas, as the case may be. On the side of each flow distribution plate 1 and 2 facing away from the electrolyte layer 3 is placed a communication passage plate 4 and 5 for defining first communication passages as described hereinafter. A seal plate 6 and 7, having openings 6a and 7a corresponding to each recess, is placed between each flow distribution plate 1 and 2 and the electrolyte layer 3 to seal off each recess 8 and 9 from one another.

One of the seal plates 6 consists of a simple plate having a uniform thickness. The other of the seal plates 7 has a relatively thick peripheral part 7b, a central recess 7c surrounded by the thick peripheral part 7b and a relatively thin central part 7d which is recessed from the peripheral part 7b. The central recess 7c is dimensioned so as to snugly receive the electrolyte layer 3. Therefore, with the electrolyte layer 3 thus placed in the central recess 7c, by placing one of the seal plate 6 over the other seal plate 7, the peripheral parts of the two seal plates 6 and 7 are made to closely contact each other, and the recesses 8 and 9 of the flow distribution plates 6 and 7 are substantially sealed off from one another.

A fuel cell assembly is thus formed by placing the communication passage plate 4, distribution plate 1, seal plate 6, electrolyte layer 3, seal plate 7, flow distribution plate 2 and communication passage plate 5 one over another, and attaching the peripheral part together, for instance by using a bonding agent. When appropriate, the boundary areas between adjacent recesses 8 and 9 may also be bonded together.

FIGS. 2(a), 2(b), 2(c), 2(e), 2(f), 2(g) and 2(h) are plan views as seen from the side of the communication passage plate 5, but FIG. 2(d) is a plan view as seen from the other communication passage plate 4 to better illustrate the pattern of the diffusion electrode layers formed over the surfaces of the electrolyte layer 3.

Referring to FIGS. 2(a) to 2(h) and FIG. 3(a), the illustrated fuel cell assembly comprises a plurality (16, in the illustrated embodiment) of identical cells C each consisting of a pair of mutually opposing recesses 8 and 9 formed on the opposing surfaces of the flow distribution plates 1 and 2, and the corresponding part of the electrolyte layer 3 interposed between these recesses 8 and 9.

Referring to FIGS. 1, 2(a) to 2(h) and 3(b), 12 of the recesses 8 of the flow distribution plate 1 are each provided with a small communication hole 11 communicating with the reverse side of the flow distribution plate 1. The surface of the corresponding communication passage plate 4 directly facing the flow distribution plate 1 is provided with six oblique grooves 13 each communicating a corresponding pair of the small communication holes 11 as best illustrated in FIGS. 2(a) and 2(b). Similarly, 12 of the recesses 9 of the flow distribution plate 2 are each provided with a small communication hole 12 communicating with the reverse side of the flow distribution plate 2. The surface of the corresponding communication passage plate 5 directly facing the flow distribution plate 2 is provided with six oblique grooves 14 each communicating a corresponding pair of the small communication holes 12 as best illustrated in FIGS. 2(g) and 2(h). These oblique grooves 13 and 14 form first communication passages when the communication passage plates 4 and 5 are placed over the opposing surfaces of the flow distribution plates 1 and 2 in cooperation with the through holes 11 and 12.

The surface of the flow distribution plate 1 facing the seal plate 6 is provided with six oblique grooves 15 each for communicating a diagonally adjacent pair of recesses 8 to each other. These grooves 15 form second communication passages when the flow distribution plate 1 is placed closely over the seal plate 6 as best illustrated in FIG. 2(b). Similarly, the surface of the flow distribution plate 2 facing the seal plate 7 is provided with six oblique grooves 16 for communicating diagonally adjacent recesses 9. These grooves 16 form second communication passages when the flow distribution plate 2 is placed closely over the seal plate 7 as best illustrated in FIG. 2(g).

The flow distribution plates 1 and 2, communication passage plates 4 and 5, and seal plates 6 and 7 are made of single crystal silicon, and the recesses, grooves and through holes are formed in them as rectangular openings by performing anisotropic etching (wet etching). However, when other working process such as dry etching is used, the shapes of the openings can be selected at will.

In the illustrated embodiment, the recesses in each flow distribution plates are communicated with the first and second communication passages in a zigzag pattern across the flow distribution plate in both X and Y directions so that each pair of adjacent recess in both X and Y directions belong to mutually different gas supply systems. Therefore, each adjacent pair of the fuel cells are given with opposite polarities.

The fuel gas (H), consisting of hydrogen gas in this case, is introduced into the recesses 8, which are communicated to each other by the grooves 13 and 15, via through holes 21 and 22 formed in a fringe portion of the communication passage plate 4, through holes 23 and 24 formed in a fringe portion of the flow distribution plate 1, and short grooves 25 and 26 extending from the through holes 23 and 24 to the adjacent recesses 8. The oxidizer gas (O), consisting of air in this case, is introduced into the recesses 8, which are communicated to each other by the grooves 13 and 15, via through holes 27 and 28 formed in a fringe portion of the communication passage plate 4, through holes 29 and 30 formed in a fringe portion of the flow distribution plate 1, and short grooves 31 and 32 extending from the through holes 29 and 30. As can be readily appreciated, the hydrogen gas and air are supplied to mutually separated gas passage systems.

The hydrogen gas (H) which has been supplied to the recesses 8 of the flow distribution plate 1 is then conducted to the recesses 9 of the other flow distribution plate 2 via short grooves 33 and 34 formed on the surface of the flow distribution plate 1 facing the seal plate 6, through holes 37 and 38 formed in a fringe portion of the seal plate 6, through holes 41 and 42 formed in a fringe portion of the seal plate 7, and short grooves 45 and 46 formed on the surface of the flow distribution plate 2 facing the seal plate 7. After passing through the recesses 9, the hydrogen gas (H) is either recovered or expelled via short grooves 49 and 50 and through holes 51 and 52 formed in the flow distribution plate 2, and through holes 57 and 58 formed in the communication passage plate 5. The recesses 9 for the hydrogen gas are communicated with one another by the grooves 16 and 14.

The air (O) which has been supplied to the recesses 8 of the flow distribution plate 1 is then conducted to the recesses 9 of the other flow distribution plate 2 via short grooves 35 and 36 formed on the surface of the flow distribution plate 1 facing the seal plate 6, through holes 39 and 40 formed in a fringe portion of the seal plate 6, through holes 43 and 44 formed in a fringe portion of the seal plate 7, and short grooves 47 and 48 formed on the surface of the flow distribution plate 2 facing the seal plate 7. After passing through the recesses 9, the oxidizer gas (O) is either recovered or expelled via short grooves 53 and 54 and through holes 55 and 56 formed in the flow distribution plate 2, and through holes 59 and 60 formed in the communication passage plate 5. The recesses 9 for the air are again communicated with one another by the grooves 16 and 14.

The electrolyte layer 3 comprises a single solid electrolyte layer 61 which is common to all of the units of the fuel cell, and gas diffusion electrode layers 62 and 63 which are placed over the two surfaces of the solid electrolyte layer 61. Each of the gas diffusion electrode layers 62 and 63 extend across a pair of adjacent fuel cells in such a manner that all of the cells in the fuel cell assembly are electrically connected in series. The solid electrolyte layer 61 may be made of such materials as perfluorocarbonsulfonic acid (Nafion: tradename), phenolsulfonic acid, polyethylenesulfonic acid, polytrifluorosulfonic acid, and so on. The gas diffusion electrode layers 62 and 63 may consist of porous sheet such as carbon sheet containing a platinum catalyst. Because adjacent cells of the fuel cell assembly has opposite polarities, simply by connecting each pair of adjacent fuel cells on a same side of the electrolyte layer, the entire fuel cells in the assembly can be connected electrically in series.

Although not shown in the drawings, some or all of the fuel cells can be connected electrically in parallel by extending each of the corresponding diffusion electrode layers across diagonally adjacent fuel cells. By suitably combining such series and parallel arrangements, it is possible to achieve a fuel cell assembly of a desired voltage or current capacity.

In the foregoing embodiment, the first and second communication passages were defined by the grooves formed in the surface of the communication passage plate 4 facing the flow distribution plate, the surface of the flow distribution plate 1 facing the seal plate 6, the surface of the flow distribution plate 2 facing the seal plate 7, and the surface of the communication passage plate facing the flow distribution plate 2, in cooperation with the through holes, but may also be defined by grooves formed in the opposite surfaces or both the opposing surfaces. If a required sealing is achieved between the electrolyte layer 3 and each of the flow distribution plates 1 and 2, it is possible to eliminate the seal plates 6 and 7.

Figure 4A:
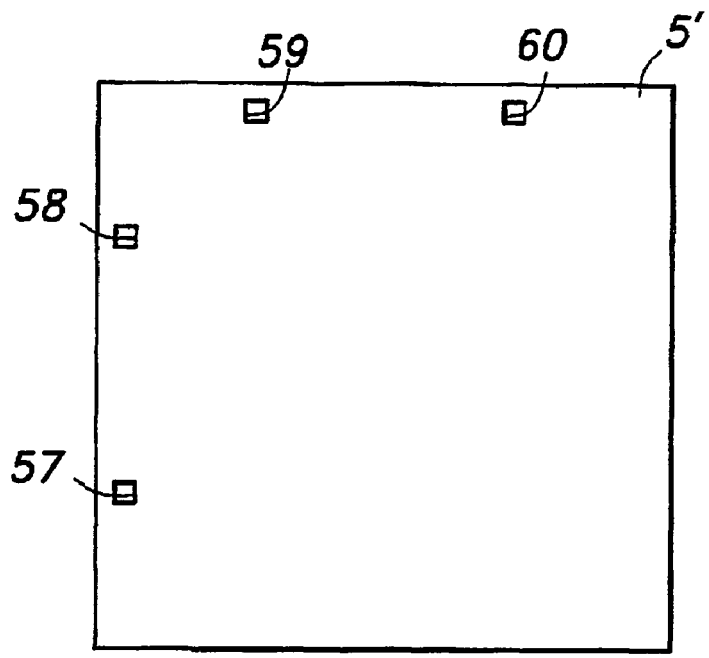
FIGS. 4(a) and 4(b) are views similar to FIGS. 2(g) and (2(h) showing a modification to the first embodiment.
Figure 4B:
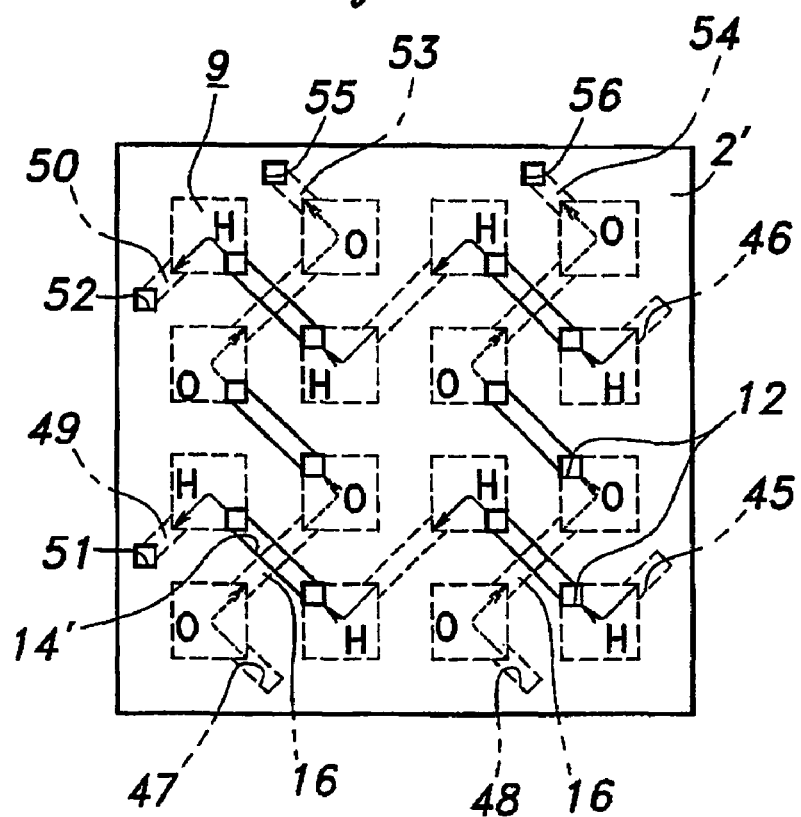

FIGS. 4(a) and 4(b) show such a modification. In the modified embodiment illustrated in FIGS. 4(a) and 4(b), the oblique grooves 14' for forming the first communication passages are formed on the backside of the flow distribution plate 2', instead of the communication passage plate 5. The oblique grooves 14' define the first passages for communicating diagonally adjacent through holes 12, in cooperation with the flat surface of a cover plate 5' which is placed over the backside or outer surface of the flow distribution plate 2. Similar oblique passages (not shown in the drawings) may be formed on the backside of the flow distribution plate 1 so as to form the first communication passage, again, in cooperation with a flat surface of a similar cover plate (not shown in the drawings).

The oblique grooves 14' and 16 cross each other on different etch-levels, one set 16 on the front side and the other set 14' on the backside of a single silicon wafer. This simplifies the construction of the cover plate 5' and offers better alignment of passages within the flow distribution plates. Thus the cover plate 5' can be thin, and manufactured very easily because it only requires through-holes as inlet and outlet ports. Alignment is now less critical because the ports can be oversized, and lower-cost methods can now be employed for manufacturing the cover plate.

If a required sealing is achieved between the electrolyte layer 3 and each of the flow distribution plates 1 and 2, it is possible to eliminate the seal plates 6 and 7.

Figure 5:
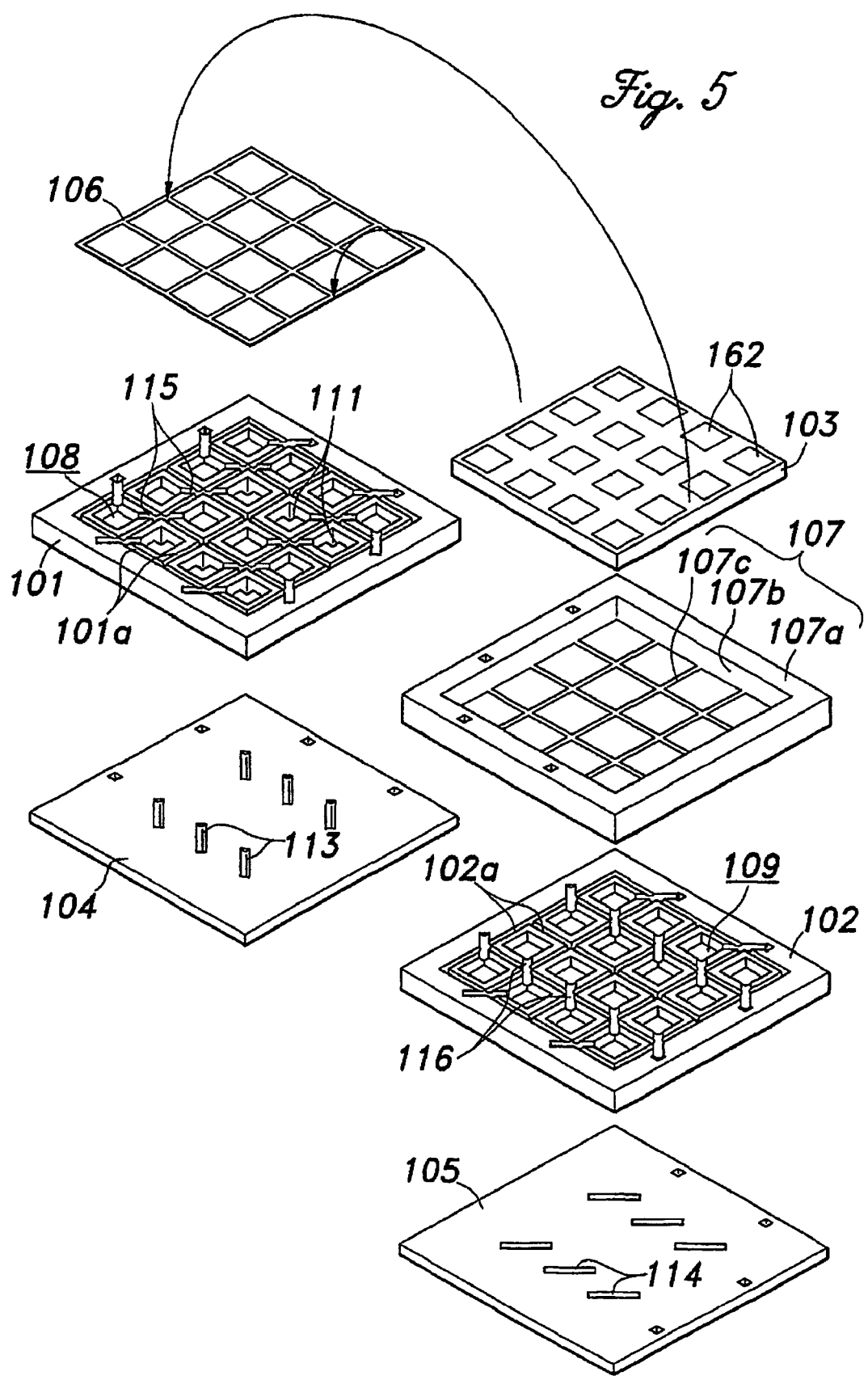
FIG. 5 is a perspective view of a fuel cell given as a second embodiment of the present invention.
Figure 7A:
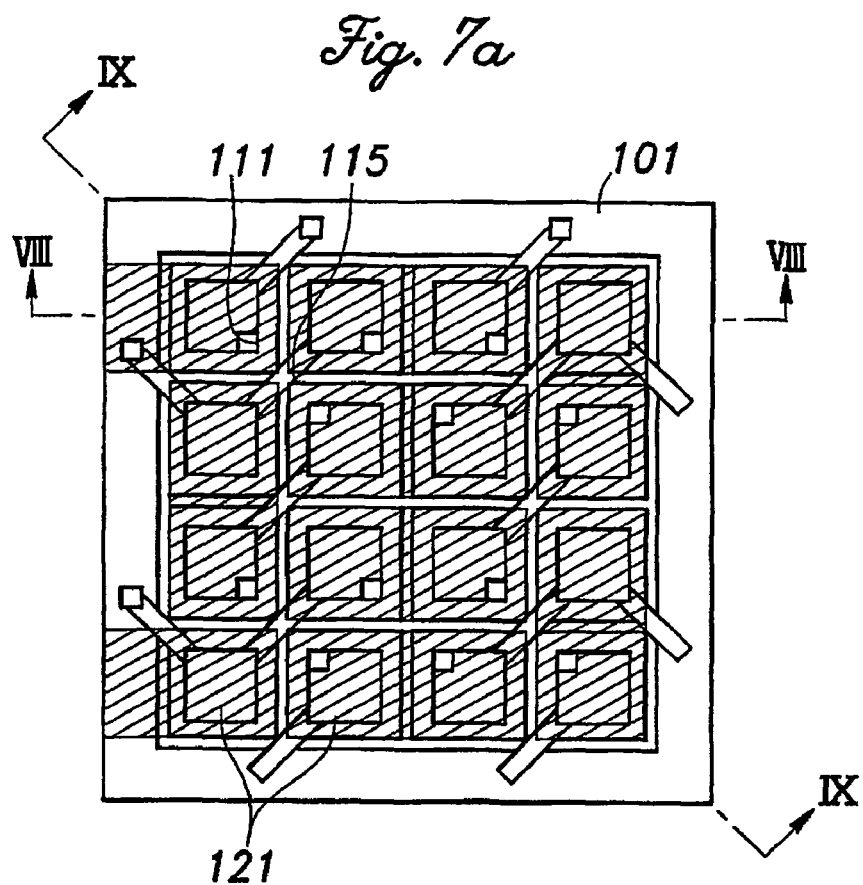
FIGS. 7(a) and 7(b) are enlarged views of the flow distribution plates of the fuel cell of FIG. 5.
Figure 7B:
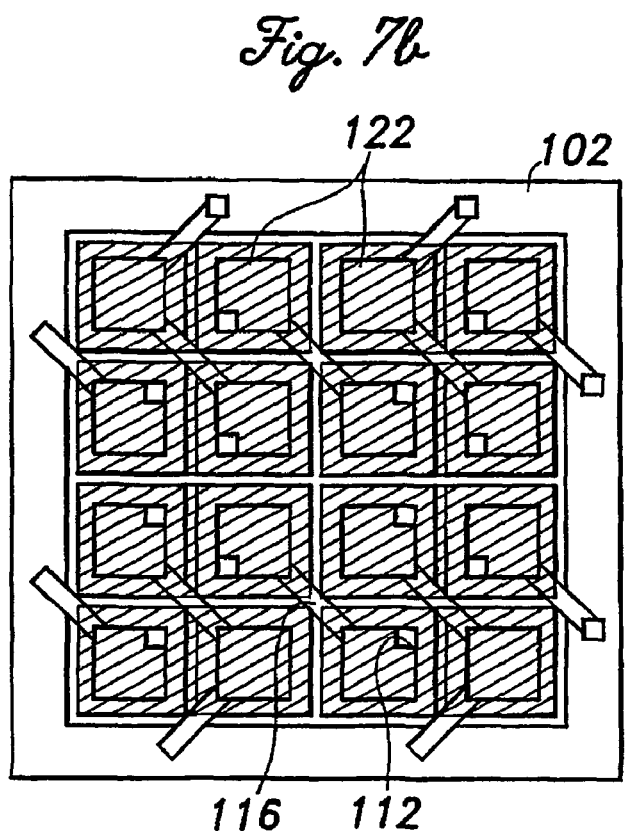

FIG. 5 is an exploded perspective view of a fuel cell assembly given as a second embodiment of the present invention. In this embodiment, the parts corresponding to those of the previous embodiment are denoted with like numerals plus 100, and description of such parts is omitted from the following description to avoid unnecessary redundancy. FIGS. 6(a) to 6(h) are plan view of the different components of the fuel cell assembly, and FIGS. 7(a) and 7(b) are enlarged plan views of the flow distribution plates 101 and 102. Because the flow scheme for the fuel gas and oxidizer gas in this embodiment is similar to that of the first embodiment, the detailed description thereof is omitted from the following description.

In this embodiment also, to define the passages for the fuel gas and oxidizer gas, the fuel cell assembly comprises a pair of flow distribution plates 101 and 102 defining a plurality (16, in this embodiment) of recesses 108 and 109, respectively, which are arranged in both X and Y directions on a plane in each case, and an electrolyte layer 103 interposed between the flow distribution plates 101 and 102.

On the surface of each flow distribution plate 101 and 102 facing away from the electrolyte layer 103 is placed a communication passage plate 104 and 105 so as to define first communication passages in a similar manner as the first embodiment.

The surface of the flow distribution plate 101 facing the electrolyte layer 103 is formed with grooves 101a in the pattern of a grid so as to surround each recess 108. These grooves 101a receive a grid-shaped seal plate 106. Another seal plate 107 is interposed between the electrolyte layer 103 and the other flow distribution plate 102. The seal plate 107 comprises a fringe portion 107a having a relatively large thickness, a central recess 107b, and a grid-shaped seal portion 107c formed in the bottom of the central recess 107b. The grid-shaped portion 107c is similar to the seal plate 106 in structure, and is received in the grooves 102a formed in the flow distribution plate 102 in the shape of a grid so as to surround each recess 109.

A fuel cell assembly is thus formed by placing the communication passage plate 104, flow distribution plate 101, seal plate 106, electrolyte layer 103, seal plate 107, flow distribution plate 102 and communication passage plate 105 one over another, and attaching the peripheral part together, for instance by using a bonding agent. The electrolyte layer 103 is snugly received in the central recess 107b of the seal plate 107, and the grid-shaped seal plate 106 is received in the corresponding grooves 101a of the flow distribution plate 101 while the grid-shaped seal portion 107c of the seal plate 107 is received in the corresponding grooves 102a of the flow distribution plate 102.

FIGS. 6(a), 6(b), 6(c), 6 (d), 6(e), 6(f) and 6(h) are plan views as seen from the side of the communication passage plate 105, but FIG. 6(g) is a plan view as seen from the other communication passage plate 104 to better illustrate the pattern of the diffusion electrodes formed over the surfaces of the electrolyte layer 103.

In this embodiment also, each of the recesses 108 of the flow distribution plate 101, the opposing recess 109 of the opposite flow distribution plate 102, and the part of the electrolyte layer 103 interposed between these recesses 108 and 109 define a fuel cell C. The illustrated fuel cell assembly consists of 16 such independent fuel cells.

Figure 9A:
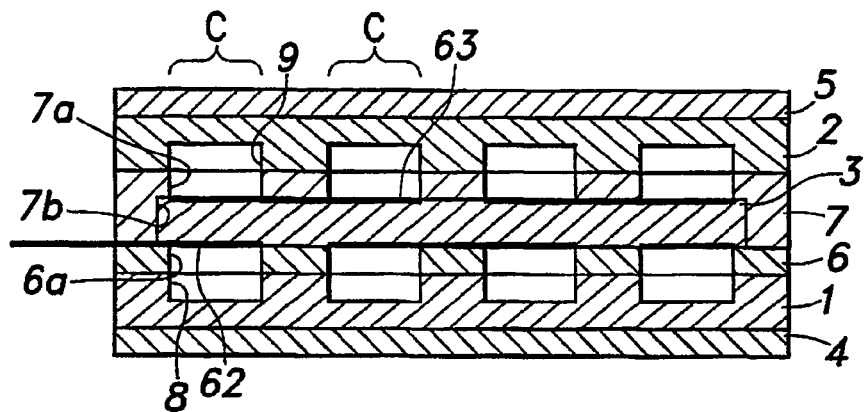
FIG. 9 is a sectional view taken along line IX—IX of FIG. 7(b)
Figure 9B:
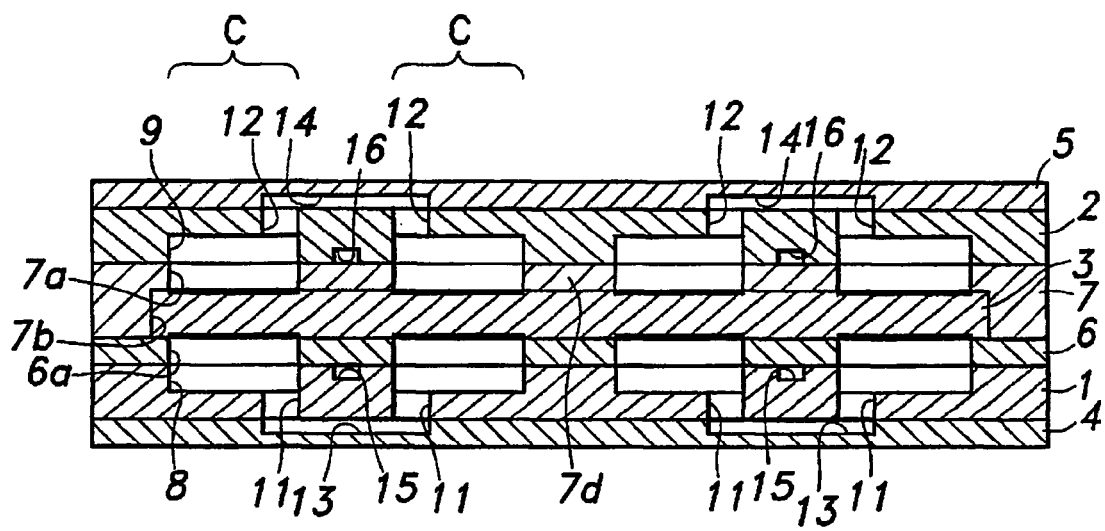
Figure 8:
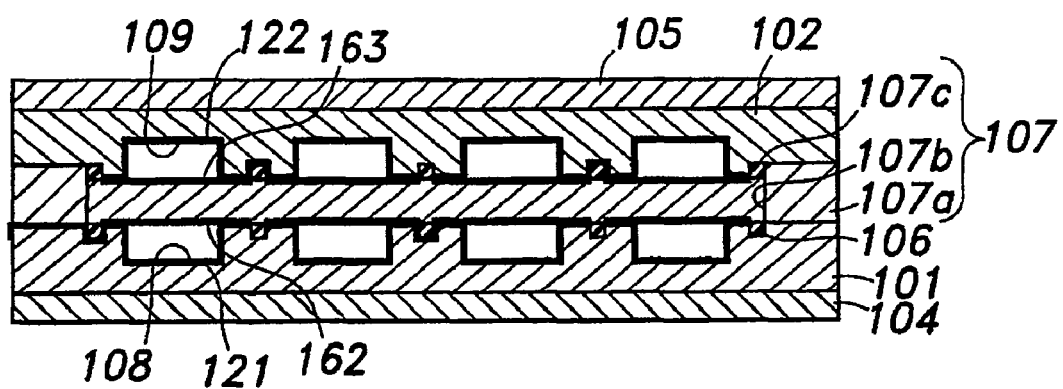
FIG. 8 is a sectional view taken along line VIII—VIII of FIG. 7(a)

Referring also to FIGS. 8 and 9, because both the seal plate 106 and electrolyte layer 103 are received in the central recess 107b of the seal plate 107 in the assembled state of the fuel cell assembly, only the communication passage plate 104, flow distribution plate 101, seal plate 107, flow distribution plate 102 and communication passage plate 105 are visible from sideways as being stacked one over another. Inside the fuel cell assembly, the flow distribution plate 101, electrolyte layer 103 and flow distribution plate 102 are stacked one over another with the seal plates 106 and 107 sealing each of the fuel cells.

Referring to FIGS. 5, 6(a) to 6(h), and 9, 12 of the recesses 108 of the flow distribution plate 101 are provided with communication holes 111 which reach the other side of the flow distribution plate 101. The surface of the communication passage plate 104 facing the flow distribution plate 101 is provided with six oblique grooves 113 each communicating a corresponding pair of the small communication holes 111. Therefore, the diagonally opposing pairs of recesses 108 are communicated with one another according to the pattern illustrated in FIGS. 6(a) and 6(b) via first communication passages formed by the through holes 111 and grooves 113. Similarly, 12 of the recesses 109 of the other flow distribution plate 102 are provided with communication holes 112 which reach the other side of the flow distribution plate 102. The surface of the communication passage plate 105 facing the flow distribution plate 102 is provided with six oblique grooves 114 each communicating a corresponding pair of the small communication holes 112. Therefore, the diagonally opposing pairs of recesses 109 are communicated with one another according to the pattern illustrated in FIGS. 6(*f*), 6(*g*) and 6(*h*) via first communication passages formed by the through holes 112 and grooves 114.

The surface of the flow distribution plate 101 facing the electrolyte layer 103 and seal plate 106 is formed with six oblique grooves 115 each communicating a diagonally adjacent pair of the recesses 108. Each groove 115 is deeper than the grooves 101*a* for receiving the seal plate 106 as shown in FIG. 8 so that the seal plate 106 would not block the grooves 115. As the seal plate 106 and electrolyte layer 103 are closely placed over the flow distribution plate 101, the grooves 115 define second communication passages, and each pair of the diagonally adjacent recesses 108 are communicated with each other according to the pattern illustrated in FIGS. 6(*a*) and 6(*b*). Similarly, the surface of the flow distribution plate 102 facing the seal plate 107 is formed with six oblique grooves 116 each communicating a diagonally adjacent pair of the recesses 109. As the grid-shaped seal portion 107*c* of the seal plate 107 and electrolyte layer 103 are closely placed over the flow distribution plate 102, the grooves 116 define second communication passages, and each pair of the diagonally adjacent recesses 109 are communicated with each other according to the pattern illustrated in FIGS. 6(*f*), 6(*g*) and 6(*h*).

The electrolyte layer 103 comprises a single solid electrolyte layer 161, and 32 diffusion electrode layers 162 and 163 arranged in the same pattern as the recesses 108 and 109, with 16 of them on one side of the solid electrolyte layer 161 and the remaining 16 on the other side. These diffusion electrode layers 162 and 163 register with the recesses 108 and 109, and are slightly larger than the recesses 108 and 109. Only the gas diffusion layers 162 on one side of the solid electrolyte layer 161 are shown in FIG. 6(*d*), but the gas diffusion layers 163 are also provided on the other side of the solid electrolyte layer 161 at the corresponding positions.

Referring to FIGS. 7(*a*) and 7(*b*), the surface of the flow distribution plate 101 facing the electrolyte layer 103 is formed with interconnect electrodes 121 consisting of gold (Au) and formed by vapor deposition or the like. Similarly, the surface of the flow distribution plate 102 facing the electrolyte layer 103 is formed with similar interconnect electrodes 122. These interconnect electrodes 121 and 122 are arranged in a similar pattern as the gas diffusion electrodes 62 and 63 of the first embodiment, and connect the fuel cells C electrically in a series. The interconnect electrodes 121 and 122 lie over the peripheral parts of the recesses 108 and 109 so that an adequate contact surface may be ensured between each interconnect electrode and the corresponding recesses.

The interconnect electrodes 121 and 122 extend into the interior of each recess 108 and 109. This increases the effective cross sectional area of the interconnect electrodes 121 and 122, and reduces the internal electric resistance of each fuel cell.

If desired, a plurality of projections may be formed in each recess 108 and 109 so as to contact the opposing gas diffusion electrode layer, and the interconnect electrodes 121 and 122 may then be formed over the projections also. The diffusion electrode layers typically have a relatively high electric resistance due to their high porosity so that the platinum catalyst contained in the diffusion electrode layers may carry a significant part of electric current. Therefore, by electrically contacting the interconnect electrode 121 and 122 with the gas diffusion electrode layers at a plurality of points via these projections, the internal electric resistance of each fuel cell can be minimized.

As the flow distribution plate 101, electrolyte layer 103 and flow distribution plate 102 are placed one over another in this order in close contact, the interconnect electrodes 121 and 122 contact the gas diffusion electrode layers 162 and 163 as shown in FIGS. 8 and 9, and the fuel cells C are all connected electrically in series. Thus, even when each gas diffusion electrode layer has a relatively high electric resistance, it is possible to minimize the overall electric resistance of the fuel cell assembly, and ensure a high power generating efficiency.

FIGS. 10(*a*) to 10(*f*) show a third embodiment of the present invention. In this embodiment, the structure of the electrolyte layer and gas diffusion electrode, and the electric connection between the different units of the fuel cell are not different from those of the first embodiment, and are therefore omitted from the following description. In fact, in the description of this embodiment, the parts corresponding to those of the first embodiment are denoted with like numerals plus 200, and description of such parts is omitted from the following description to avoid unnecessary redundancy.

The fuel cell assembly of this embodiment comprises a pair of flow distribution plates 201 and 202 each provided with recesses 208 and 209 for conducting fuel gas or oxidizer gas and two systems of passages communicating the recesses of the same gas passage system to one another, and an electrolyte layer 203 closely interposed between the flow distribution plates 201 and 202. In this embodiment, the sides of the flow distribution plates 201 and 202 facing away from the electrolyte layer 203 are not provided with any communication passage plate as opposed to the previous embodiments. A seal plate 206 provided with rectangular openings 206*a* corresponding to the recesses 208 is interposed between the flow distribution plate 201 and the electrolyte layer 203 to seal off each fuel cell from the adjacent cells, and permit communication only through prescribed communication passages. A similar seal plate 207 provided with rectangular openings 207*a* corresponding to the recesses 209 is interposed between the flow distribution plate 202 and the electrolyte layer 203 to seal off each fuel cell from the adjacent fuel cells.

The seal plate 207 comprises a relatively thick peripheral part 206*a*, a central recess 206*b*, and grid-shaped seal portion 206*c* provided in the bottom portion of the central recess 206*b*. The central recess 206*b* is adapted to snugly receive the electrolyte layer 203. By placing the seal plate 207 over the seal plate 206 with the electrolyte layer 203 received in the central recess 206*b* of the seal plate 206, the peripheral parts of the two seal plates 206 and 207 are brought into a sealing engagement.

Figure 11A:
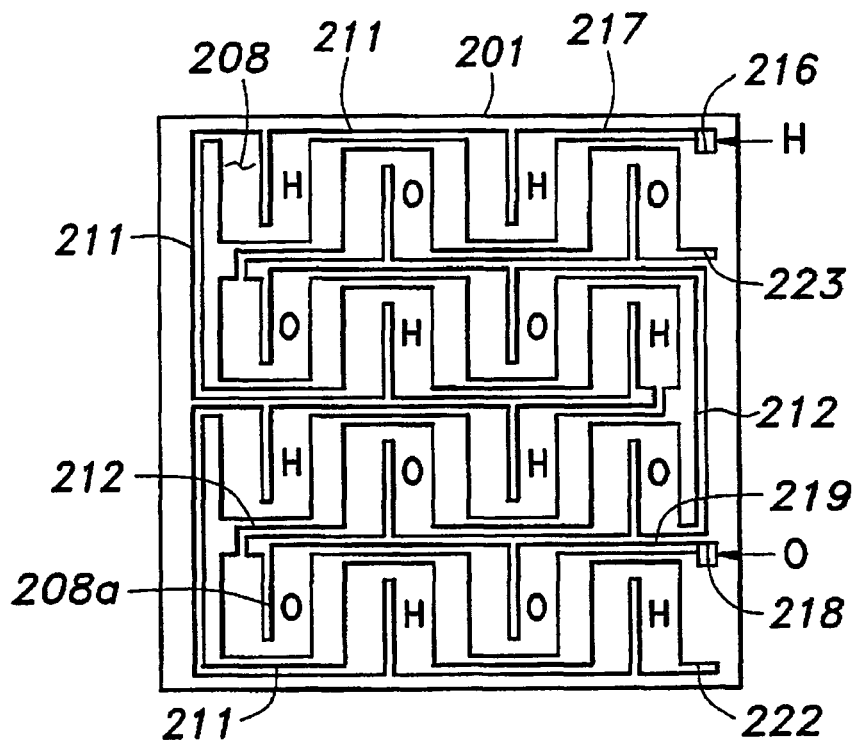
FIGS. 11(a) and 11(b) are enlarged views of the flow distribution plates of the fuel cell of the third embodiment.
Figure 11B:
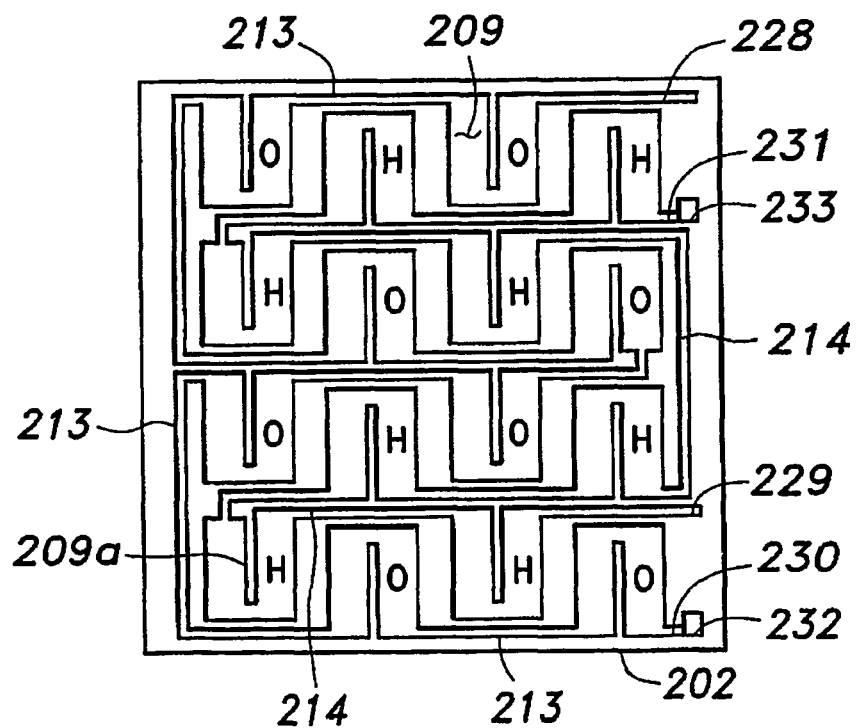

As best illustrated in the enlarged view of FIG. 11(*a*), the recesses 208 of the flow distribution plate 201 are communicated to one another in an alternate fashion via communication grooves 211 forming a fuel gas passage system and communication grooves 212 forming an oxidizer gas passage system. These passages 211 and 212 are formed in the grid shaped region and peripheral region surrounding the recesses 208. Similarly, as shown in FIG. 11(*b*), the recesses 209 of the flow distribution plate 202 are communicated to one another in an alternate fashion via communication grooves 213 forming an oxidizer gas passage system and communication grooves 214 forming a fuel gas passage system. These passages 213 and 214 are again formed in the grid shaped region and peripheral region surrounding the recesses 209. By placing the flow distribution plates 201 and 202 over the different sides of the electrolyte layer 203 via the seal plate 206 and 207, each adjacent pair of the 16 fuel cells are associated with the two gas passage systems in mutually opposite senses, and are thus given with a mutually opposite electric polarities. Each recess 208 and 209 is provided with a central partition 208a and 209a extending partly across the recess so that the gas flow may circulate over the entire volume of the recess.

The fuel gas H, which may consist of hydrogen gas, is supplied to the recesses 208 of the flow distribution plate 201 via a through hole 216 formed in a fringe portion of the flow distribution plate 201 and an inlet passage 217. The oxidizer gas O, which may consist of air, is supplied to the recesses 208 of the flow distribution plate 201 via a through hole 218 formed in a fringe portion of the flow distribution plate 201 and an inlet passage 218.

The fuel gas H which has passed through the recesses 208 of the flow distribution plate 201 is supplied to the recesses 209 of the other flow distribution plate 202 via an exit passage 222 formed in a fringe portion of the flow distribution plate 201, through hole 224 formed in a fringe portion of the seal plate 206, through hole 226 formed in a fringe portion of the seal plate 207, and inlet passage 228 formed in the other flow distribution plate 202. After passing through the recesses 209, the fuel gas H is expelled from an exit passage 230 and through hole 232 formed in a fringe portion of the flow distribution plate 202 via the communication grooves 213.

The oxidizer gas O which has passed through the recesses 208 of the flow distribution plate 201 is supplied to the recesses 209 of the other flow distribution plate 202 via an exit passage 223 formed in a fringe portion of the flow distribution plate 201, through hole 225 formed in a fringe portion of the seal plate 206, through hole 227 formed in a fringe portion of the seal plate 207, and inlet passage 229 formed in the other flow distribution plate 202. After passing through the recesses 209, the oxidizer gas O is expelled from an exit passage 231 and through hole 233 formed in a fringe portion of the flow distribution plate 202 via the communication grooves 214.

Figure 12A:
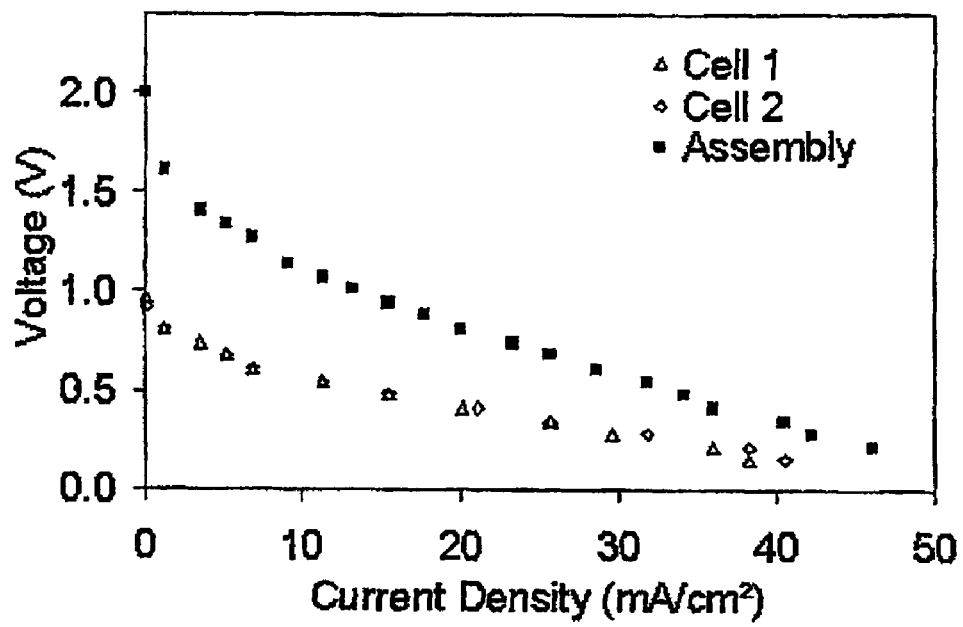
FIGS. 12(a) and 12(b) are current-voltage plots of fuel cell assemblies according to the present invention.
Figure 12B:
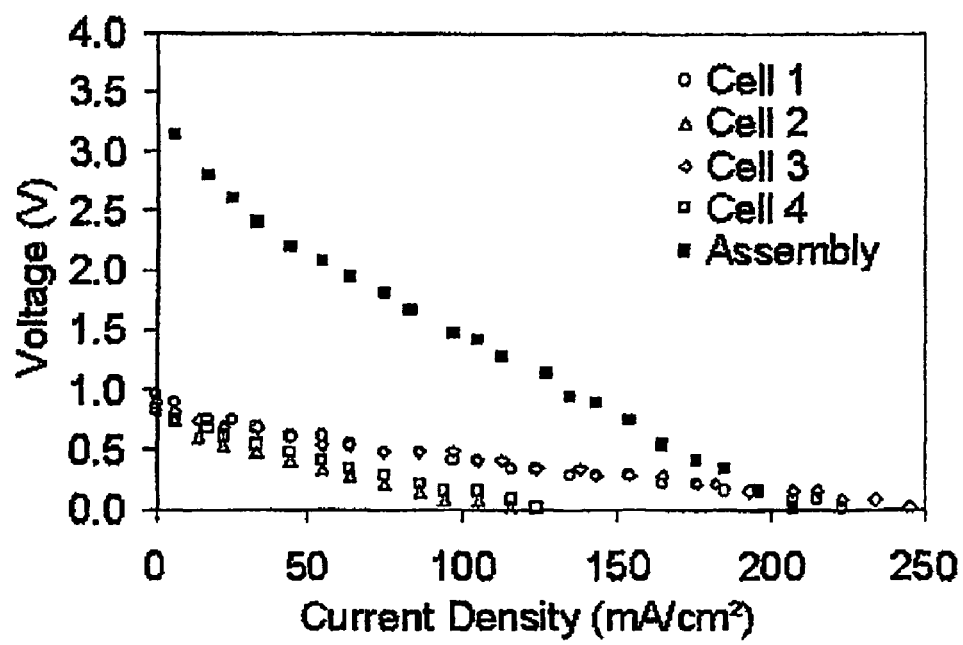

FIG. 12(a) shows an actual current-voltage plot of a two-cell assembly according to the present invention. The experiment in FIG. 12a was run with a truly continuous one-piece membrane onto which electrode pairs were bonded, and the gas channels were linked externally with tubing and tee-fittings. The specifications of this fuel cell assembly are listed in the following:
two-cell assembly, 22 mm×22 mm per cell
MEA consisting of continuous Nafion and carbon cloth
catalyst Pt/C 0.4 mg/cm$^2$
glass flow structures by wet-etching, 400 $\mu$m islands, 150 $\mu$m deep
200 nm sputtered gold on flow structures for interconnection
fuel: hydrogen, 35 kPa, unhumidified
oxidant: oxygen, 35 kPa, unhumidified
no external heating to cell FIG. 12(b) shows an actual current-voltage plot of a four-cell assembly according to the present invention. The experiment in FIG. 12b was run with a flow structure that had all channels connected in an integrated design on a single silicon wafer. Individual compartments were linked by cross-channels on the front side and oblique grooves on the back side of the silicon wafer. However, in this second example there were actually four separate MEA's positioned adjacent to one another, but substantially identical results would have been obtained if a single common MEA were used. The specifications of this fuel cell assembly are listed in the following:
four-cell assembly, 10 mm×10 mm per cell
MEA consisting of Nafion and carbon cloth
catalyst Pt/C 0.4 mg/cm$^2$
Si flow structures by dry-etching, 100 $\mu$m islands, 200 $\mu$m deep
110 nm sputtered gold on flow structures for interconnection
fuel: hydrogen, 100 kPa, unhumidified
oxidant: oxygen, 100 kPa, unhumidified
no external heating to cell In both cases, the output voltage is not significantly less than the sum of the output voltage of the individual fuel cells even when a relatively large current is drawn from the fuel cell assembly. It demonstrates a favorable insulation between individual cells and a low internal resistance in the electric conductance path of the fuel cell assembly.

Although the present invention has been described in terms of preferred embodiments thereof, it is obvious to a person skilled in the art that various alterations and modifications are possible without departing from the scope of the present invention which is set forth in the appended claims. For instance, although the fuel and oxidant for the fuel cells are described and claimed as consisting of gases throughout the text of this application, it should be understood that they may also consist of liquid without departing from the scope and spirit of this application.

What is claimed is:

1. A fuel cell assembly comprising a plurality of cells each including an electrolyte layer, a pair of diffusion electrode layers interposing said electrolyte layer between them, and a pair of flow distribution plates for defining passages for fuel and oxidant fluids that contact said diffusion electrode layers, wherein:
   said fuel cells are arranged on a common plane,
   wherein each of said flow distribution plates comprises a plurality of recesses formed on a side thereof facing said electrolyte layer so as to form individual cells, said recesses being communicated to one another according to a prescribed pattern by said communication passages.

2. A fuel cell assembly according to claim 1, wherein communication passages for communicating fluid passages defined on each side of said electrolyte layer at a prescribed pattern are formed on at least one side of said flow distribution plate.

3. A fuel cell assembly according to claim 2, wherein said communication passages are formed on a side of each of said flow distribution plates facing said electrolyte layer.

4. A fuel cell assembly according to claim 2, further comprising a communication passage plate placed on a side of at least one of said flow distribution plates facing away from said electrolyte layer;
   said communication passages including first communication passages that are defined between said flow distribution plate and communication passage plate so as to communicate with the corresponding fluid passages via through holes formed in said flow distribution plate, and second communication passages that are defined between said flow distribution plate and electrolyte layer so that said fluid passages are communicated with one another according to a prescribed pattern jointly by said first and second communication passages.

5. A fuel cell assembly according to claim 4, wherein said communication passages and through holes communicate said fluid passages in such a manner that adjacent fuels cells have opposite polarities.

6. A fuel cell assembly according to claim 1, wherein said fuel cells share a common planar electrolyte layer.

7. A fuel cell assembly according to claim 6, wherein said fuel cells comprises those disposed in a peripheral part of said electrolyte layer, and those disposed in a central part of said electrolyte layer.

8. A fuel cell assembly according to claim 1, further comprising a communication passage plate placed on an outer side of said flow distribution plate, said communication passage plate being provided, on a side facing said flow distribution plate, with grooves for communicating said recesses with one another according to a prescribed pattern jointly with through holes passed across said flow distribution plate.

9. A fuel cell assembly according to claim 1, further comprising a seal plate interposed between each of said flow distribution plates and said electrolyte layer so as to seal off adjacent recesses from one another, said communication passages and through holes communicating said recesses in such a manner that adjacent fuels cells have opposite polarities.

10. A fuel cell assembly according to claim 9, wherein one of said seal plates is provided with a central recess and a relatively thick peripheral part in such a manner that said two seal plates are sealably engaged with each other along a peripheral part thereof while said electrolyte layer is received in said central recess.

11. A fuel cell assembly according to claim 9, wherein at least one of said seal plates comprises a grid-shaped portion which is adapted to be received in corresponding grooves formed on the opposing surface of the corresponding flow distribution plate.

12. A fuel cell assembly according to claim 1, wherein said diffusion electrode layers extend across parts of said electrolyte layer belonging to adjacent cells according to a prescribed pattern so that at least part of said plurality of cells are electrically connected in series.

13. A fuel cell assembly according to claim 1, wherein said fuel cells are provided with individual diffusion electrode layers, said fuel cell assembly further comprising interconnect electrode layers which extend across diffusion electrode layers of adjacent cells according to a prescribed pattern so that at least part of said plurality of cells are electrically connected in series.

* * * * *

UNITED STATES PATENT AND TRADEMARK OFFICE
CERTIFICATE OF CORRECTION

| | | |
|---|---|---|
| PATENT NO. | : 6,991,868 B2 | Page 1 of 1 |
| APPLICATION NO. | : 10/275591 | |
| DATED | : January 31, 2006 | |
| INVENTOR(S) | : Sang-Joon Lee et al. | |

It is certified that error appears in the above-identified patent and that said Letters Patent is hereby corrected as shown below:

Title page, item [73] second assignee should read
--Board of Trustees of the Leland Stanford Junior University.--

Signed and Sealed this

Twenty-first Day of November, 2006

JON W. DUDAS
*Director of the United States Patent and Trademark Office*